United States Patent
Ito

(10) Patent No.: US 11,258,095 B2
(45) Date of Patent: Feb. 22, 2022

(54) SOLID-STATE RECHARGEABLE BATTERY

(71) Applicant: TAIYO YUDEN CO. LTD., Tokyo (JP)

(72) Inventor: Daigo Ito, Tokyo (JP)

(73) Assignee: TAIYO YUDEN CO. LTD., Tokyo (JP)

( * ) Notice: Subject to any disclaimer, the term of this patent is extended or adjusted under 35 U.S.C. 154(b) by 0 days.

(21) Appl. No.: 16/741,201

(22) Filed: Jan. 13, 2020

(65) Prior Publication Data

US 2020/0153039 A1    May 14, 2020

Related U.S. Application Data

(63) Continuation of application No. 15/258,448, filed on Sep. 7, 2016, now abandoned.

(30) Foreign Application Priority Data

Oct. 29, 2015 (JP) ................................ 2015-212665

(51) Int. Cl.
| | |
|---|---|
| *H01M 10/0562* | (2010.01) |
| *H01M 10/0585* | (2010.01) |
| *H01M 10/0525* | (2010.01) |
| *H01M 4/58* | (2010.01) |
| *H01M 4/62* | (2006.01) |

(52) U.S. Cl.
CPC ..... *H01M 10/0562* (2013.01); *H01M 4/5825* (2013.01); *H01M 4/626* (2013.01); *H01M 10/0525* (2013.01); *H01M 10/0585* (2013.01); *H01M 2300/0068* (2013.01); *H01M 2300/0071* (2013.01)

(58) Field of Classification Search
CPC ......... H01M 10/0525; H01M 10/0562; H01M 10/0585; H01M 4/5825
See application file for complete search history.

(56) References Cited

U.S. PATENT DOCUMENTS

| | | | |
|---|---|---|---|
| 7,914,932 B2 | 3/2011 | Yoshida | 429/203 |
| 8,304,115 B1 | 11/2012 | Petkov | 429/304 |
| 2007/0037059 A1 | 2/2007 | Salot | 429/304 |
| 2007/0042265 A1 | 2/2007 | Tamai | 429/162 |
| 2007/0202400 A1 | 8/2007 | Yoshida | 429/203 |
| 2007/0202414 A1* | 8/2007 | Yoshida | H01M 4/5825 429/304 |
| 2009/0317724 A1* | 12/2009 | Kumar | H01M 10/056 429/320 |
| 2016/0141716 A1* | 5/2016 | Ito | H01M 10/052 429/162 |

FOREIGN PATENT DOCUMENTS

| | | |
|---|---|---|
| CN | 103762360 A | 4/2014 |
| JP | 2007-508671 A | 4/2007 |
| JP | 2007-258165 | 10/2007 |
| JP | 5122154 B2 | 1/2013 |
| JP | 2014049198 A | 3/2014 |
| WO | WO 2014208133 A1 | 12/2014 |

OTHER PUBLICATIONS

EPO website machine translation of WO 2014208133 A1 (Year: 2014).
Ito et al. "All Solid State Batteries using Olivine Cathodes and NASICON Electrolytes", Battery Symposium in Japan Oct. 6, 2013, vol. 54, p. 338. (Year: 2013).
Wu et al., "Novel Synthesis of LiCoPO4—Li3V2(P04)3 composite cathode materials for Li-ion batteries" Materials Letters 152 (Apr. 2, 2015) pp. 228-231. (Year: 2015).
www.espacenet.com EPO machine translation of CN 103762360A (Year: 2014).
Japanese Office Action dated Feb. 25, 2019, issued to Japanese Application No. 2015-212665.

* cited by examiner

*Primary Examiner* — Gregg Cantelmo
(74) *Attorney, Agent, or Firm* — Stein IP, LLC

(57) ABSTRACT

A solid-state rechargeable battery includes a pair of electrode layers and a solid electrolyte layer interposed between the pair of electrode layers. The pair of electrode layers each includes a phosphate having an olivine crystal structure. The phosphate contains a transition metal and lithium.

3 Claims, 2 Drawing Sheets

FIG. 2C

SOLID-STATE RECHARGEABLE BATTERY

CROSS-REFERENCE TO RELATED APPLICATIONS

This application is a continuation of U.S. patent application Ser. No. 15/258,448, filed Sep. 7, 2016, now abandoned, which claims the benefit of Japanese Application No. 2015-212665, filed Oct. 29, 2015, in the Japanese Patent Office. All disclosures of the document(s) named above are incorporated herein by reference in their entireties.

BACKGROUND OF THE INVENTION

1. Field of the Invention

The present invention relates to a solid-state rechargeable battery including a solid electrolyte.

2. Description of the Related Art

Lithium ion rechargeable batteries and electric double-layer capacitors have been developed actively as large-capacity electrochemical devices and are starting to be used in various applications such as consumer appliances, industrial machinery, and automobiles. In rechargeable batteries including an electrolyte solution, for example, a leakage of the electrolyte solution may occur. Accordingly, solid-state batteries, which are constituted by solid components only, have been developed by using a solid electrolyte. The solid-state batteries commonly include a positive current collector, a positive electrode layer, a solid electrolyte layer, a negative electrode layer, and a negative current collector.

There have been disclosed methods in which a multilayer body constituted by thin layers is used in order to enhance the responsivity and capacity density of a solid-state lithium ion rechargeable battery. For example, Japanese Patent No. 5122154 discloses a method for producing a multilayer solid-state battery. It is intended to enhance the energy density of the solid-state battery by employing a multilayer structure.

SUMMARY OF THE INVENTION

Accordingly, an object of the present invention is to increase the discharge capacity of a solid-state rechargeable battery that has been charged and the operating potential of the solid-state rechargeable battery at which the solid-state rechargeable battery is discharged in order to further increase the use of the solid-state rechargeable battery.

A solid-state rechargeable battery according to an aspect of the present invention includes a pair of electrode layers and a solid electrode layer interposed between the pair of electrode layers. The pair of electrode layers each include a phosphate having an olivine crystal structure. The phosphate contains a transition metal and lithium. The transition metals contained in the phosphates included in the electrode layers may be the same as or different from each other and are preferably the same as each other. It is more preferable that the phosphates included in the electrode layers have the same chemical composition.

BRIEF DESCRIPTION OF THE DRAWINGS

FIGS. 2A to 2E are schematic cross-sectional views of a multilayer body, illustrating an example method for producing the multilayer body.

DESCRIPTION OF THE PREFERRED EMBODIMENTS

Figure 1:
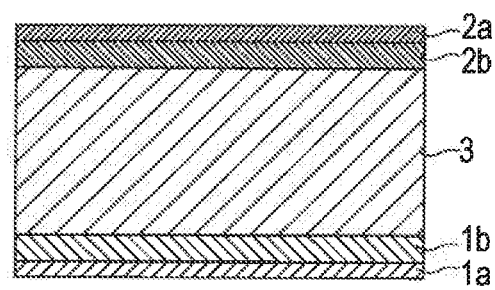
FIG. 1 is a schematic cross-sectional view of a solid-state rechargeable battery according to an embodiment of the present invention.

An embodiment of the present invention is described below with reference to the attached drawings. Note that the present invention is not limited to the embodiment illustrated in the drawings. In the drawings, the features of a solid-state rechargeable battery according to the embodiment may be emphasized; all components of the solid-state rechargeable battery are not always illustrated on an exact scale in the drawings.

FIG. 1 is a cross-sectional view of a solid-state rechargeable battery according to an embodiment. The solid-state rechargeable battery has a basic structure including a pair of electrode layers 1$b$ and 2$b$ and a solid electrolyte layer 3 interposed therebetween. The electrode layers 1$b$ and 2$b$ include current collectors 1$a$ and 2$a$, respectively, through which electrons are released and received. In general, one of the pair of electrode layers serves as a positive electrode and the other electrode layer serves as a negative electrode depending on, for example, the difference in potential between the electrodes.

In this embodiment, the electrode layers 1$b$ and 2$b$ each include a phosphate having an olivine crystal structure which contains a transition metal and lithium. In other words, both electrode layer 1$b$ and electrode layer 2$b$ include such a phosphate. Such a phosphate has been commonly used as a positive electrode active material. An olivine crystal structure is the structure of crystals of natural olivine. The presence of an olivine crystal structure can be determined by X-ray diffractometry.

A typical example of a phosphate having an olivine crystal structure which contains a transition metal and lithium is $LiCoPO_4$, which contains Co as a transition metal. Other phosphates denoted by the above chemical formula in which the transition metal has been changed may also be used. In such a case, the proportions of Li and $PO_4$ vary in accordance with the valence number of the transition metal. Preferable examples of the transition metal include Co, Mn, Fe, and Ni.

When a phosphate having an olivine crystal structure which contains a transition metal and lithium is included in an electrode layer that serves as a positive electrode, it serves as a positive electrode active material as in the related art. When a phosphate having an olivine crystal structure which contains a transition metal and lithium is included in an electrode layer that serves as a negative electrode, it increases the discharge capacity of the battery and the operating potential of the battery at which the battery is discharged. Although the mechanisms by which such a phosphate produces the above advantageous effects are not fully clarified, this is presumably because the phosphate partially forms a solid solution together with a negative electrode active material.

The phosphate included in each of the pair of electrode layers 1$b$ and 2$b$ contains a transition metal, which may be the same as or different from that contained in the other phosphate. In other words, the phosphates included in the electrode layers 1$b$ and 2$b$ may contain the same transition metal or different transition metals. The electrode layers 1$b$ and 2$b$ may each contain only one transition metal or two or more transition metals. It is preferable that the electrode layers 1$b$ and 2$b$ contain the same transition metal. It is more preferable that the phosphates included in the electrode layers 1b and 2b have the same chemical composition. When the electrode layers 1b and 2b contain the same transition metal or include a phosphate having the same composition, the similarity between the compositions of the electrode layers 1b and 2b is increased. In such a case, even if the solid-state rechargeable battery according to the embodiment is unintentionally connected with reversed polarity, the solid-state rechargeable battery may endure practical use without causing a malfunction depending on the use of the battery.

One of the pair of electrode layers 1b and 2b may further include a substance commonly used as a negative electrode active material. Adding a negative electrode active material to only one of the electrode layers makes it clear that the electrode layer serves as a negative electrode and the other electrode layer serves as a positive electrode. It is also possible to add a substance commonly used as a negative electrode active material to both of the electrode layers. Examples of the negative electrode active material include compounds such as titanium oxide, lithium-titanium composite oxide, carbon, and lithium vanadium phosphate, which are used in the related art regarding rechargeable batteries.

In the production of the pair of electrode layers 1b and 2b, for example, solid electrolyte materials and conducting materials (i.e., conductant agents) such as carbon and metals may further be used in addition to the above active materials. These materials may be uniformly dispersed in water or an organic solvent together with a binder and a plasticizer to form an electrode-layer-forming paste. Examples of the metals used as a conductant agent include Pd, Ni, Cu, Fe, and alloys of these metals.

Examples of a conducting metal constituting the current collectors connected to the respective electrode layers 1b and 2b include, but are not limited to, single-element metals such as Ni, Cu, Pd, Ag, Pt, Au, Al, and Fe, alloys of these metals, and oxides of these metals. The electrode layers and current collectors are formed using the above electrode-layer-forming paste and a current-collector-forming conducting metal paste. For example, printing may be performed on a green sheet of a solid electrolyte layer described below by using the electrode-layer-forming paste, and printing is again performed using the conducting metal paste. The printing method is not limited, and various printing methods known in the related art, such as screen printing, intaglio printing, letterpress printing, and calendar rolling, may be employed. Although it is considered to be the most common to use screen printing for producing a highly multilayer device constituted by thin layers, it may be suitable to use ink-jet printing in some cases where electrodes having a fine pattern or a special shape need to be formed.

In this embodiment, the electrode layers 1b and 2b may have the same composition. In such a case, the battery is symmetrical in terms of polarity. This eliminates the need for paying attention to the polarity of the battery when the battery is connected.

In this embodiment, the solid electrolyte layer 3 is composed of a substance that is solid at normal temperature. Various substances known in the related art may be used as a material of the solid electrolyte layer. It is preferable to use, for example, a phosphate having a NASICON structure which contains lithium. Such a phosphate is known in the related art as a material of solid electrolytes and may be used without particular limitations. A typical example of such a phosphate is composite lithium phosphate containing Ti. It is possible to add a metal element such as Al, Ge, Sn, Hf, Zr, Y, or La to the composite lithium phosphate. Al may be replaced with another trivalent transition metal such as Ga, In, or La. Specific examples of a phosphate having a NASICON structure which contains lithium include, but are not limited to, Li—Al—Ge—$PO_4$ materials and $LiTi_2(PO_4)_3$. It is preferable to use a Li—Al—Ge—$PO_4$ material that contains the same transition metal as that contained in the phosphates included in the electrode layers 1b and 2b. For example, in the case where the electrode layers 1b and 2b include a phosphate containing Co and Li, it is preferable that the solid electrolyte layer contain a Li—Al—Ge—$PO_4$ material containing Co. This reduces the elution of the transition metal contained in the electrode active materials to the electrolyte.

A method for forming the solid electrolyte layer is not limited, and various methods known in the related art may be used appropriately. For example, the above phosphate material is prepared so as to have an appropriate grain size distribution and uniformly dispersed in an aqueous solvent or an organic solvent together with a binder, a dispersant, a plasticizer, and the like to form a slurry. In the preparation of the slurry, a bead mill, a wet jet mill, various types of kneaders, a high-pressure homogenizer, and the like may be used. In particular, it is preferable to use a bead mill, with which the control of the grain size distribution of the phosphate material and the dispersion of the phosphate material can be performed at the same time. The resulting slurry is applied to a film in order to form a green sheet having a predetermined thickness. The coating method is not limited, and various coating methods known in the related art may be used. Examples of the coating methods include, but are not limited to, a slot die method, reverse coating, gravure coating, bar coating, and a doctor blade method.

A method for producing a multilayer body is not limited, and production methods known in the related art may be used appropriately. Commonly, precursors (e.g., green sheets) of the pair of electrode layers and the solid electrolyte layer are stacked on top of one another. Subsequently, a print layer composed of the conducting metal paste which serves as a precursor of the current collector is formed on the stacked precursors. The stacked precursors are press-bonded to one another by a suitable method to form a multilayer body (i.e., precursor of a multilayer portion). This multilayer body is subsequently fired. Firing of the multilayer body may be performed in an oxidizing atmosphere or a nonoxidizing atmosphere. The maximum temperature in the firing step is preferably set to, but not limited to, 400° C. to 1000° C. and is more preferably set to 500° C. to 900° C. A step in which the multilayer body is maintained at a temperature lower than the maximum temperature in an oxidizing atmosphere may be conducted in order to remove the binder to a sufficient degree before the maximum temperature is reached. It is desirable to perform firing at a low temperature in order to reduce the process cost. A reoxidation treatment may optionally be performed subsequent to the firing step. The solid-state rechargeable battery according to an embodiment of the present invention is produced in the above-described manner.

Figure 2A:
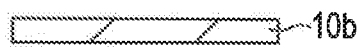
Figure 2B:
Figure 2D:
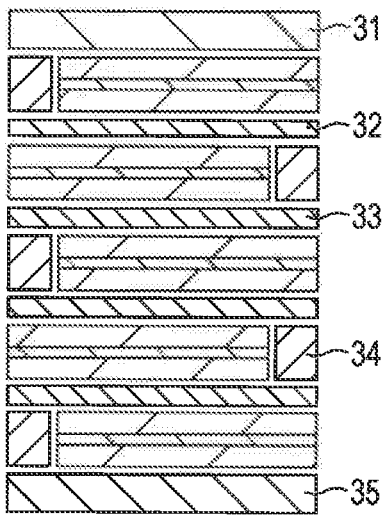
Figure 2E:
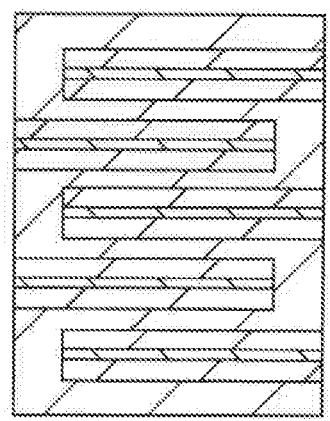

FIGS. 2A to 2E are schematic cross-sectional views of the multilayer body, illustrating an example method for producing the multilayer body. A precursor 10b of an electrode layer is prepared as illustrated in FIG. 2A. A print layer composed of a conducting metal paste which serves as a precursor 10a of a current collector is formed on one surface of the precursor 10b as illustrated in FIG. 2B. Subsequently, another precursor 10b is formed on the surface of the precursor 10a such that a multilayer structure including two precursors 10b of electrode layers and the precursor 10a of a current collector interposed therebetween is formed as illustrated in FIG. 2C. A plurality of the multilayer bodies illustrated in FIG. 2C are prepared in the above-described manner and stacked on top of one another. When the multilayer bodies are stacked on top of one another, precursors 31 to 35 of solid electrolyte layers may be interposed between each pair of the multilayer bodies as illustrated in FIG. 2D. Subsequently, the stacked precursors are press-bonded to one another to form a multilayer body illustrated in FIG. 2E. The multilayer body is fired in the above-described manner and may optionally be cut into a desired shape.

EXAMPLES

An embodiment of the present invention is described more specifically with reference to Examples below. However, the present invention is not limited to the embodiment described in Examples below.

Example 1

Preparation of Raw Materials

Raw material compounds ($Li_2CO_3$, $Al_2O_3$, $GeO_2$, $NH_4H_2PO_4$, $Co_3O_4$) were mixed such that the molar ratio between $Li_2O$, $Al_2O_3$, $GeO_2$, $P_2O_5$, and $Co_3O_4$ was 24.38/5.63/11.25/56.25/250. The resulting mixture was fired in the air at 850° C. to synthesize a solid electrolyte. An XRD analysis of the solid electrolyte confirmed that the solid electrolyte mainly had a NASICON crystal structure.

Raw material compounds were mixed such that the molar ratio between $Li_2O$, $Co_3O_4$, and $P_2O_5$ was 37.50/25.00/37.50 and the resulting mixture was fired to synthesize a positive electrode active material. An XRD analysis of the positive electrode active material confirmed that the positive electrode active material was composed of only the $LiCoPO_4$ phase having an olivine crystal structure. Raw material compounds ($Li_2CO_3$, $Al_2O_3$, $TiO_2$, $NH_4H_2PO_4$, and $Co_3O_4$) were mixed such that the molar ratio between $Li_2O$, $Al_2O_3$, $TiO_2$, $P_2O_5$, and $Co_3O_4$ was 24.38/5.63/11.25/56.25/2.50. The resulting mixture was fired in the air at 850° C. to synthesize a negative electrode active material. An XRD analysis of the negative electrode active material confirmed that the negative electrode active material mainly had a NASICON (sodium (Na) Super Ionic Conductor) crystal structure.

Preparation of Sheets

The synthesized positive electrode active material, the synthesized negative electrode active material, and metal Pd were mixed in an ethanol-toluene mixed solvent such that the volume fractions of the positive electrode active material, the negative electrode active material, and metal Pd were 23.3%, 46.7%, and 30.0%, respectively. A plasticizer and a binder were added to the resulting mixture, and the mixture was subsequently kneaded with a bead mill. The kneaded mixture was applied to a PET film in order to prepare a green sheet of an electrode layer. The synthesized solid electrolyte was also formed into a slurry and applied to a film as in the preparation of a green sheet of an electrode layer. Thus, a green sheet of a solid electrolyte was prepared.

Preparation of Multilayer Body

A Pd paste was applied to the green sheet of the electrode layer by screen printing in order to form a Pd current collector. Two green sheets of an electrode layer on which the Pd current collector was formed, 2 green sheets of an electrode layer on which the Pd current collector was not formed, and 30 green sheets of a solid electrolyte were each cut into a piece having a diameter of 16 mm by punching. The Pd current collector layer, the electrode layer, 30 solid electrolyte layers, the electrode layer, and the Pd current collector layer were stacked in this order such that the Pd current collector layers disposed on the respective sides of the multilayer body faced outward. The stacked layers were press-bonded to one another at a pressure of 30 MPa to form a plate-like body. The plate-like body was interposed between high-purity alumina plates and fired at a time in an $N_2$ atmosphere at 600° C. to form a sintered plate.

Evaluation 1

The sintered plate including electrode layers disposed on the respective surfaces, which was prepared by firing, was encased in a 2032 coin cell in a glove box filled with an argon atmosphere. Thus, an evaluation solid-state battery cell was prepared. This cell was subjected to a charge-discharge test at 150° C. Specifically, the cell was charged at a current of 36 µA until a voltage of 2.7 V was reached and then discharged at a current of 18 µA until a voltage of 2 V was reached. The initial discharge capacity of the cell was 152 µAh. The operating potential at the time an amount of electric charge which corresponded to 50% of the discharge capacity of the cell was discharged was 2.42 V.

Evaluation 2

One of the current collector layers and one of the electrode layers were removed by grinding one surface of the sintered plate. An SPE film and a metal lithium foil were formed on the surface of the sintered plate from which the current collector layer and the electrode layer were removed. The resulting sintered plate was encased in a coin cell as in Evaluation 1. Thus, an evaluation sample was prepared. The charge-discharge characteristics of the remaining electrode layer that served as a positive electrode were evaluated. Specifically, the cell was charged at a current of 36 µA until a voltage of 5.1 V was reached and discharged at a current of 18 µA until a voltage of 4 V was reached. Two stages of plateau in the vicinity of 4.7 to 4.9 V, which are distinctive characteristics of $LiCoPO_4$, were observed during both charging and discharging of the cell. The initial discharge capacity of the cell was 142 µAh. The term "plateau" is a battery term that refers to a region in which the potential is flat.

Evaluation 3

An evaluation sample was prepared as in Evaluation 2, and the charge-discharge characteristics of the remaining electrode layer that served as a negative electrode were evaluated. Specifically, adsorption of Li was performed at a current of 36 µPA until a voltage of 2 V was reached, and desorption of Li was performed at a current of 18 µA until a voltage of 3 V was reached. The charge-discharge potential was 2.3 to 2.4 V, which was slightly lower than that of a NASICON-type Li—Al—Ti—P—O compound, that is, 2.5 V. It was confirmed that the potential varied continuously compared with a NASICON-type Li—Al—Ti—P—O compound. This is presumably because of $LiCoPO_4$ that was present abundantly in the negative electrode. The initial Li desorption capacity of the negative electrode was 240 µAh. The initial coulombic efficiency was 95%. The operating potential at the time an amount of Li ions which corresponded to 50% of the Li desorption capacity was desorbed was 2.42 V.

Comparative Example 1

A solid-state battery was prepared as in Example 1, except that a positive electrode was prepared from the green sheet of the electrode layer used in Example 1 and the green sheet described below was prepared and used as a negative electrode. The charge-discharge characteristics of the solid-state battery were evaluated as in Evaluation 1 above. The green sheet of the negative electrode was prepared such that the electrode layer did not contain $LiCoPO_4$, that is, the volume fractions of a NASICON-type Li—Al—Ti—P—O compound and Pd were 70% and 30%, respectively. The above-described battery was charged at a current of 36 µA until a voltage of 2.7 V was reached and discharged at a current of 18 µA until a voltage of 2 V was reached. The initial discharge capacity was 72 µAh. The potential at the time an amount of electric charge which corresponded to 50% of the total discharge capacity was discharged was 2.25 V. A comparison between the results of Example 1 and the results of Comparative Example 1 confirmed that adding $LiCoPO_4$ to a negative-electrode-side electrode layer enhanced the operating potential of the battery.

Comparative Example 2

An evaluation sample was prepared as in Evaluation 3 above, except that the green sheet of an electrode layer was prepared so as not to contain $LiCoPO_4$, that is, such that the volume fractions of a NASICON-type Li—Al—Ti—P—O compound and Pd were 70% and 30%, respectively. The chare-discharge characteristics of the evaluation sample were evaluated. Specifically, the adsorption of Li was performed at a current of 84 µA until a voltage of 2 V was reached, and the desorption of Li was performed at a current of 42 µA until a voltage of 3 V was reached. The initial Li desorption capacity of the negative electrode was 80 µAh. The initial coulombic efficiency was 40%. The operating potential at the time an amount of Li ions which corresponded to 50% of the Li desorption capacity was desorbed was 2.58 V. A comparison between the results of Evaluation 3 in Example 1 and the results of Comparative Example 2 confirmed that the absence of $LiCoPO_4$ increased the operating potential of the negative electrode and the presence of $LiCoPO_4$ increased the available voltage.

Although a few embodiments of the present invention have been shown and described, it would be appreciated by those skilled in the art that changes may be made in this embodiment without departing from the principles and spirit of the invention, the scope of which is defined in the claims and their equivalents.

We claim:

1. A method for producing a solid-state rechargeable battery, the method comprising;
    forming a precursor of an electrode layer, including a phosphate having an olivine crystal structure which contains cobalt and lithium, and further including a negative electrode active material;
    forming a precursor of a solid electrolyte layer, including a cobalt containing Li—Al—Ge—$PO_4$ material synthesized from raw material compounds containing $Li_2O$, $Al_2O_3$, $GeO_2$, $P_2O_5$, $NH_4H_2PO_4$, and $Co_3O_4$;
    preparing a plurality of the precursors of the electrode layer and a plurality of the precursors of the solid electrolyte layer, and stacking a precursor of the solid electrolyte layer in relation to a plurality of precursors of the electrode layer so as a precursor of the solid electrolyte layer is interposed between adjacent pluralities of precursors of the electrode layer;
    press-bonding the stacked precursors; and
    firing the stacked precursors.

2. The method for producing a solid-state rechargeable battery according to claim 1, wherein one of the electrode layers further comprises NASICON structure.

3. The method for producing a solid-state rechargeable battery according to claim 1, wherein the raw material compounds are mixed such that the molar ratio between $Li_2O$, $Al_2O_3$, $GeO_2$, $P_2O_5$, and $Co_3O_4$ is 24.38/5.63/11.25/56.25/2.50.

* * * * *